United States Patent
Zenou et al.

(10) Patent No.: US 11,185,396 B2
(45) Date of Patent: Nov. 30, 2021

(54) 3D FABRICATION FOR DENTAL APPLICATIONS BASED ON ABLATION

(71) Applicant: IO Tech Group Ltd., London (GB)

(72) Inventors: Michael Zenou, Hashmonaim (IL); Guy Nesher, Nes Ziona (IL); Ziv Gilan, Kfar-harif (IL)

(73) Assignee: IO Tech Group Ltd., London (GB)

( * ) Notice: Subject to any disclaimer, the term of this patent is extended or adjusted under 35 U.S.C. 154(b) by 81 days.

(21) Appl. No.: 16/774,403

(22) Filed: Jan. 28, 2020

(65) Prior Publication Data

US 2020/0261191 A1 Aug. 20, 2020

Related U.S. Application Data

(60) Provisional application No. 62/807,382, filed on Feb. 19, 2019, provisional application No. 62/823,079, filed on Mar. 25, 2019.

(51) Int. Cl.

| | |
|---|---|
| *A61C 8/00* | (2006.01) |
| *A61C 13/00* | (2006.01) |
| *A61C 5/00* | (2017.01) |
| *A61C 19/00* | (2006.01) |
| *C08F 2/46* | (2006.01) |
| *C08F 2/50* | (2006.01) |
| *C08G 61/04* | (2006.01) |
| *B29C 64/268* | (2017.01) |
| *B29C 64/205* | (2017.01) |
| *A61C 13/08* | (2006.01) |
| *B33Y 70/00* | (2020.01) |
| *B33Y 80/00* | (2015.01) |

(52) U.S. Cl.
CPC ...... *A61C 13/0019* (2013.01); *A61C 13/0013* (2013.01); *A61C 13/08* (2013.01); *B29C 64/205* (2017.08); *B29C 64/268* (2017.08); *B33Y 70/00* (2014.12); *B33Y 80/00* (2014.12)

(58) Field of Classification Search
CPC . A61C 13/08; A61C 13/0019; A61C 13/0013; A61C 13/006; A61C 13/0018; A61C 13/022; A61C 5/77; A61C 5/20; A61C 5/007; A61C 19/066; B33Y 40/20; B33Y 70/10; B33Y 70/00; B33Y 10/00; B33Y 80/00; B29C 64/205; B29C 64/268
USPC .......... 433/201.1, 167, 25, 215; 522/6, 189, 522/184, 1; 520/1
See application file for complete search history.

(56) References Cited

U.S. PATENT DOCUMENTS

| | | |
|---|---|---|
| 4,098,612 A | 7/1978 | Rhodes et al. |
| 4,174,973 A | 11/1979 | Rhodes et al. |
| 5,059,266 A | 10/1991 | Yamane et al. |
| 5,096,862 A | 3/1992 | Mathers et al. |
| 5,204,055 A | 4/1993 | Sachs et al. |
| 5,231,062 A | 7/1993 | Mathers et al. |
| 5,506,607 A | 4/1996 | Sanders, Jr. et al. |
| 5,590,454 A | 1/1997 | Richardson |
| 5,740,051 A | 4/1998 | Sanders, Jr. et al. |
| 5,902,441 A | 5/1999 | Bredt et al. |
| 6,270,335 B2 | 8/2001 | Leyden et al. |
| 6,322,728 B1 | 11/2001 | Brodkin et al. |
| 6,660,209 B2 | 12/2003 | Leyden et al. |
| 6,921,500 B1 | 7/2005 | Feenstra |
| 6,939,489 B2 | 9/2005 | Moszner et al. |
| 6,955,776 B1 | 10/2005 | Feenstra |
| 7,189,344 B2 | 3/2007 | Rheinberger et al. |
| 9,592,105 B2 | 3/2017 | Hauptmann et al. |
| 2002/0006532 A1 | 1/2002 | Robin |
| 2004/0094058 A1 | 5/2004 | Kasperchik et al. |
| 2014/0272121 A1* | 9/2014 | Ng .......... B29C 33/448 427/133 |
| 2017/0189995 A1 | 7/2017 | Zenou et al. |
| 2018/0071989 A1* | 3/2018 | Zenou ............. B29C 64/268 |

FOREIGN PATENT DOCUMENTS

WO 2014/078537 A1 5/2014

OTHER PUBLICATIONS

International Search Report and Written Opinion dated Apr. 7, 2020, from the ISA/European Patent Office, for International Application No. PCT/IB2020/050664 (filed Jan. 28, 2020), 13 pages.
International Preliminary Report on Patentability dated Apr. 20, 2021, from the IPEA/European Patent Office, for International Patent Application No. PCT/IB2020/050664 (filed Jan. 28, 2020), 12 pgs.

* cited by examiner

*Primary Examiner* — Jessica Whiteley
(74) *Attorney, Agent, or Firm* — Ascenda Law Group, PC

(57) ABSTRACT

A three-dimensional dental device is fabricated in a layer-by-layer approach using a support material. The support material is deposited in a liquid form on a surface, hardened by cooling or ultraviolet (UV) curing, and selectively ablated to create an area within which the desired structure of the dental device will be formed. Active dental material is deposited into this area, and the layer-by-layer process repeated until the three-dimensional dental device has been completed. Thereafter, any remaining support material is removed by water or other solvent.

20 Claims, 3 Drawing Sheets

3D FABRICATION FOR DENTAL APPLICATIONS BASED ON ABLATION

RELATED APPLICATIONS

This is a NONPROVISIONAL of, claims priority to, and incorporates by reference U.S. Provisional Application No. 62/807,382, filed Feb. 19, 2019, and U.S. Provisional Application No. 62/823,079, filed Mar. 25, 2019.

FIELD OF THE INVENTION

The present invention relates to printable material systems, for example such systems as are configured for making dental products such as artificial teeth, dentures, splints, veneers, inlays, onlays, copings, frame patterns, crowns and bridges, models, appliances, and the like.

BACKGROUND

Conventional manufacturing processes used to make parts are based on a layer-by-layer technique. In this technology, the part that is manufactured is considered a series of discrete cross-sectional regions that when combined make a three-dimensional ("3D") structure. The building-up of a part layer-by-layer is very different than conventional machining technologies, where metal or plastic pieces are cut and drilled to a desired shape.

In rapid prototyping technologies, parts are produced directly from computer-aided design (CAD) or other digital images. Software is used to slice the digital image into thin cross-sectional layers. Then, the part is constructed by placing layers of plastic or other hardenable material on top of each other. There are many different techniques that can be used to combine the layers of structural material. A curing step may be required to fully cure the layers of material.

Ink-jet printing technology can be used to fabricate three-dimensional objects, as described in Sachs et al., U.S. Pat. No. 5,204,055. In this technology, printer heads are used to discharge a binder material onto a layer of powder particulate in a powder bed. The powdered layer corresponds to a digitally superposed section of the object that will be produced. The binder causes the powder particles to fuse together in selected areas. This results in a fused cross-sectional segment of the object being formed. The steps are repeated for each new layer until the desired object is achieved. In a final step, a laser beam scans the object causing the powdered layers to sinter and fuse together.

In another ink-jet printing process, as described in Sanders, U.S. Pat. Nos. 5,506,607 and 5,740,051, a low-melting point thermoplastic material is dispensed through one ink-jet printing head to form a three-dimensional object. A second ink-jet printing head dispenses wax material to form supports for the three-dimensional object. After the object has been produced, the wax supports are removed, and the object is finished as needed.

Leyden et al., U.S. Pat. Nos. 6,660,209 and 6,270,335, disclose an ink-jet printing method using commercial print heads having multiple jets to selectively dispense droplets of hot melt, radiation-curable material onto a substrate. Each jet is equipped with a piezoelectric element that causes a pressure wave to propagate through the material when electric current is applied. The print head moves along a scan path selectively depositing the flowable material onto the substrate. In a subsequent step, light radiation is used to cure the material.

Yamane et al., U.S. Pat. No. 5,059,266, discloses an ink-jetting method, whereby a photosetting or thermosetting resin is jetted along a flight passage of the material to a stage. By controlling the jetting operation of the material, the article is formed.

Bredt et al., U.S. Pat. No. 5,902,441, describes another ink-jet printing method, which involves applying a layer of powder particles containing an activatable adhesive onto a flat surface that can be indexed downward. The ink-jet printer introduces an activating fluid onto to the layer of particles in a predetermined pattern. The fluid activates the adhesive in the mixture, causing the particles to adhere together in an essentially solid layer. After the first cross-sectional portion of the article is formed, the movable surface can be indexed downward. Successive layers of the mixture of particles are applied in the same manner to form the desired article.

Kasperchik et al., US Patent Application Publication No. 2004/0094058, discloses an ink-jet printing system using acid-base cements. Layers of powder particulate are deposited on a flat surface. The powders include a base such as a metal oxide or an aluminosilicate glass, a polymeric acid, or other acid. The ink-jet printer dispenses an aqueous binder. The basic powder interacts with the acid in the presence of water, causing the formation of an ionically cross-linked hydrogel salt. Formation of the cross-linked hydrogel causes setting of the mixture.

More particularly, ink-jet printing methods for making three-dimensional dental products have been developed and are described in the patent literature:

Moszner et al., U.S. Pat. No. 6,939,489, discloses a process for fabricating three-dimensional dental form pieces for dental restoration and replacement parts using three-dimensional plotting technology. The object is produced in a layered manner by the cutting away of micro drops or micro cords discharged from nozzles in the three-dimensional plotter. The discharged material can be hardened by a variety of mechanisms depending upon the type of material used. This includes cooling of melted material, polycondensation, polyaddition, thermal-curing, and light radiation.

Rheinberger et al., U.S. Pat. No. 7,189,344, discloses a process for producing three-dimensional dental restorative parts, such as full or partial dental prosthesis, using ink-jet printing. The process involves spraying a polymerizable material onto a base support in a layer-by-layer manner. Each layer of material is polymerized by a light source prior to the application of the next layer. The polymerizable material is described as wax-like, having up to 70% by weight of at least one of a polymerizable monomer and oligomer, from 0.01% to 10% by weight of a polymerization initiator, and at least 20% by weight of a mixture having a selected one of a wax-like and flowable monomer and a color pigment.

Feenstra, U.S. Pat. Nos. 6,921,500 and 6,955,776, discloses an ink-jet printing process for making dental elements such as crowns using a liquid binder and powder bed. The element is produced by applying successive layers of powder and discharging the liquid binder onto the layers using an ink-jet printer. The binder preferably includes nanometric, inorganic solid particles having polymerizable and/or polycondensable organic groups at their surface. After the binder has been applied to the last layer of powder, any excess, unbound powder is removed. Then, the powdered layers are sintered by heating to a temperature in the range of about 400° C. to 800° C. The sintering step is performed so that only necks between the powder particles are formed. The resulting sintered dental element is infiltrated by a second phase material, such as glass-ceramic or polymer, which melts at a lower temperature than the material of the dental element. This reduces the porosity of the dental element.

Brodkin et al., U.S. Pat. No. 6,322,728, describes solid free form fabrication techniques, such as fused deposition modelling and three-dimensional printing, used to create a dental restoration. Three-dimensional printing includes ink-jet printing a binder into selected areas of sequentially deposited layers of powder. Each layer is created by spreading a thin layer of powder over the surface of a powder bed. Instructions for each layer may be derived directly from a CAD representation of the restoration. A binding material is applied onto the ceramic or composite layer. This application of powder/binder material is repeated several times to produce the desired shape of the restoration. After the layering process is completed, the structure is cured to further promote binding of the particles.

Sun et al., International Patent Application Publication No. WO 2014078537A1, describes a liquid resin system for fabricating three-dimensional dental devices using Digital Light Processor (DLP) projectors or other light beam irradiations, such as stereolithography (SLA). The DLP method or stereolithography and materials can be used to make any dental device. In this method, a polymerizable liquid resin material or heated resin material as a liquid is loaded into a resin bath of a 3D printer based on a DLP method or stereolithography. In the case of the DLP method, it builds 3D objects by projecting sequential voxel planes into liquid resin (or heated resin), which then polymerize to solid. Successive layers of polymerized material are added in this manner until the device is completely fabricated. Then the device, is washed, finished, and fully final cured as needed.

SUMMARY OF THE INVENTION

In one embodiment of the invention, a three-dimensional dental device is fabricated by applying a layer of support material in a liquid form on a substrate surface; hardening the support material by cooling or ultraviolet (UV) curing to create a solid layer of support material; ablating, using a laser beam, undesirable portions of the solid layer of support material to create an area within the solid layer of support material in which a desired structure will be formed; depositing active dental material (e.g., amalgam, a composite, glass ionomer, gold, ceramic, steel, titanium, acrylic resins, polymer, zirconium, or tooth bleaching products) into the area within the solid layer of support material in which a desired structure will be formed; repeating the applying, hardening, ablating, and depositing steps, layer by layer, until the three-dimensional dental device has been completed; and removing remaining support material by water or other solvent. The layer of support material may be applied on the substrate surface by any of: ink jet printing, laser-induced forward transfer (LIFT), digital light projector (DLP) printing, stereolithographic (SLA) printing, or mechanically. In some cases, a second curing of the support material may be performed to create a hardened outer surface of the support material. Where used, the second curing of the support material may be performed using UV radiation of a same wavelength that was used for the UV curing to create the solid layer of support material. Alternatively, the second curing of the support material may be performed using UV radiation of a different wavelength than was used for the UV curing to create the solid layer of support material.

The active dental material may be deposited in a liquid form by any of ink jet printing, laser-induced forward transfer (LIFT), digital light projector (DLP) printing, stereolithographic (SLA) printing, or mechanically. Following deposition of the active dental material, solvent may be removed from the deposited dental material by heating (e.g., by air flow or exposure to a heating lamp).

Following deposition of the active dental material, the dental material may be hardened (e.g., by UV curing). Further, following removal of the remaining support material, the three-dimensional dental device may be sintered in an oven.

In embodiments including any or all of the above processes, the support material may be a water-based support material that includes one or more of: water miscible solvents, water-soluble polymers, and monomers that form a water-soluble polymer. For example, the support material may be one or more of: polyvinyl pyrrolidone, polyethylene glycol, poly acrylic acid, poly propyl acrylamide, vinyl pyrrolidone, acrylic acid, ethylene glycol acrylate family, iso propyl acrylamide; and a laser wavelength absorber. The laser wavelength absorber may, in some embodiments, be of 0.1%-5% by volume. In other embodiments, the laser wavelength absorber may be of greater percentage by volume, e.g., up to approximately 20% by volume or even up to approximately 50% by volume. Further, the laser wavelength absorber may be carbon fillers, metals, inorganic pigments, and/or organic pigments.

In other embodiments including any or all of the above processes, the support material may be a wax-based support material. For example, the wax-based support material may include polyethylene wax, polypropylene wax, polyethylene glycol wax, bees wax, carnauba wax, and/or iso paraffin wax, and a laser wavelength absorber such as carbon fillers, metals, inorganic pigments, and/or organic pigments.

In still further embodiments including any or all of the above processes, the support material may be an emulsifier-based support material that includes water miscible solvents, or water-soluble polymers and monomers that form a water-soluble polymer with the addition of 5% oil and 0.1%-1% emulsifier by volume.

These and additional embodiments of the invention are described below.

BRIEF DESCRIPTION OF THE DRAWINGS

The present invention is illustrated by way of example, and not limitation, in the figures of the accompanying drawings, in which.

DESCRIPTION

Figure 1:
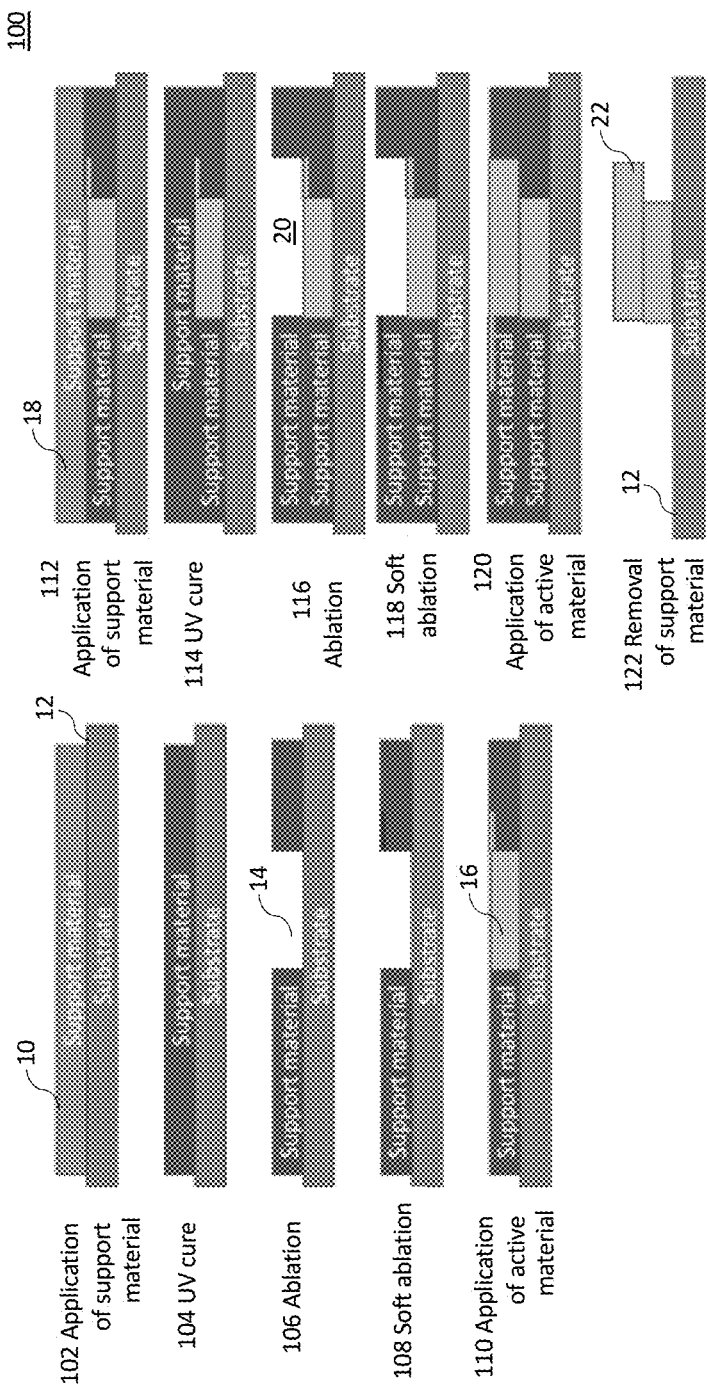
FIG. 1 illustrates an outline of a water-based process in accordance with some embodiments of the invention.

The present invention relates generally to rapid prototyping systems for making dental devices such as, for example, artificial teeth, dentures, splints, veneers, inlays, onlays, copings, frame patterns, crowns and bridges, models, appliances, and the like. More particularly, such dental devices may be fabricated using a support material that can be sculpted by ablation to build-up the dental device as a three-dimensional object from novel liquids. The support material can be printed by LIFT (laser-induced forward transfer), SLA (stereolithography), DLP (digital light processing), ink jet, or a mechanical system and can be formed by a laser beam to remove undesirable parts and to shape each layer in turn. The support material is able to change phase or cure before ablation and to be removed after finishing the model by water or other eco-friendly solvent.

In embodiments of the present invention, an ablation-based 3D printer is used to create a structure of material in a layer-by-layer manner to build-up an object. The resulting three-dimensional object has very good dimensional stability. In one embodiment, several material systems are used to manufacture a dental device. The present materials are suitable for dental applications and have both mechanical strength and excellent physical properties. Further, these materials have good biocompatibility making them ideal for dental applications.

The dental devices can be prepared using the following components:
  a. Support material
  b. Active material
  c. Laser ablation and UV radiation.

In various embodiments of the present invention, a three-dimensional dental device is fabricated as follows:
  1) A support material in a liquid form (by heating or without heating) is applied on a surface in a uniform layer, either by ink jet, LIFT, DLP, SLA, or other mechanical approach(es).
  2) The support material is then toughened (cured) by cooling or exposure to ultraviolet (UV) radiation to create a solid support material. Preferably, an additional second cure (using the same or another wavelength of radiation) is used for the outer film of each layer to create an even harder outer film than is produced during the first curing.
  3) A laser beam is used for ablation of undesirable parts of the support material. The laser beam does not penetrate the bottom layers due to precision of work or by using the difference between the hardness of the outer layer and the inner parts.
  4) The dental material is then deposited onto the structure's surface material in a liquid form (by heating or without heating) and applied on a surface in a uniform layer, either by ink jet, LIFT, DLP, SLA, or other mechanical approach(es).
  5) Heating is used to remove solvent from the dental material by air flow or heating lamp. In other applications, UV curing may be needed for the dental material and UV curing may be used for hardening.
  6) Layer by layer deposition based on stages 1-5 is used to create the dental object and then the support material is removed by water or other eco-friendly solvent.
  7) If needed for the object, the final structure may then be taken to a high temperature oven for sintering.

1. The Support Material.

A support material in accordance with embodiments of the present invention has the following properties:

A. Water solubility (or other easy to remove materials): Using water soluble substances as a support material is very beneficial as it makes the eventual removal of the support material straightforward. Support materials for use in accordance with the present invention are, therefore, preferably easy to remove using water, and preferably cold water.

B. Low ablation threshold: Another desirable property for the support material is connected to the ablation process. A material that requires only low energy for the ablation process reduces the overall energy used in the process and also reduces the overall time for fabrication of the dental device. Therefore, support materials for use in accordance with the present invention preferably are low ablation threshold materials, i.e., materials with an excellent combination of good absorption at the laser wavelength and a low bond energy, thus providing for fast cutting and evaporation.

C. Non-toxic vapor: Ablation processes can create a toxic vapor; therefore, support materials for use in accordance with the present invention preferably are materials that will create a non-toxic vapor.

D. Material properties: The support material should be strong enough to hold the desired dental structure immobile and be inert to its components. The support material should also be able to change its rheological behavior between three different states: it should be flowing when applied to a substrate or other surface, solid during buildup of the dental device, and its layer should be evaporated by ablation without damaging the layers below. Support materials for use in accordance with the present invention therefore preferably exhibit these qualities.

A support material that fulfills all of the above conditions can be prepared in any one of the following ways or using a combination of these several ways:

A. Water soluble base: Using only water miscible solvents, water-soluble polymers, and monomers that form a water-soluble polymer will fulfill the first condition. Examples of water-soluble materials are: polyvinyl pyrrolidone, polyethylene glycol, poly acrylic acid, poly propyl acrylamide, etc. Examples of monomers that create a water-soluble polymer under UV radiation (in the presence of a photo initiator) are: vinyl pyrrolidone, acrylic acid, ethylene glycol acrylate family, iso propyl acrylamide, etc.

Adding water soluble solvents, mostly from the glycol family, to the water soluble base yields a material that exhibits both solubility in water and a low energy ablation threshold with non-toxic vapor. The solvents, mostly those with high viscosity, can be used as part of the structure without significant deterioration of the needed mechanical properties. During ablation, the lowest bond energy substance will be the first to leave the structure (i.e., the first to be vaporized). Therefore, the solvents, even those with a high boiling point, that are held only by hydrogen bonds, which are much weaker than other chemical bonds, will be the first to leave; thus, reducing the ablation threshold and adding no toxic vapor.

In order to reduce the ablation threshold a good absorber at the laser wavelength should be used. For that purpose, a material with very good absorption will be dispersed in the support material in, e.g., 0.1%-5% by volume, or, in other embodiments, of greater percentage by volume, for example, up to approximately 20% by volume or even up to approximately 50% by volume, to achieve a desirable absorption effect. Examples of good absorbers that can be used are carbon fillers, metals, inorganic pigments, and some highly designed organic pigments. Some good examples for organic pigments are: SDA 1906, SDA 3734 and SDA 3755 (from H.W. Sands Corp. of Jupiter, Fla.), and for inorganic pigments Black 444, Green 260 and Blue 10K525 (from Shepherd Color Company of Cincinnati, Ohio) are good examples.

Preferably, the ablation should affect only one layer of support material each time. Therefore, a distinction between the properties of a last-completed layer and a new layer is desirable. Accordingly, a second UV (or IR) absorbing system may be added to the formulation to allow a second UV (or IR) curing only to an outer surface of each layer. For example, after application, a support material may be UV cured at one wavelength (e.g., a lower wavelength, for example 365 nm), to create a solid structure. Then, by ablation, undesired parts may be evaporated. Subsequently, the support material may be UV cured at another wavelength (e.g., a higher wavelength, for example 400 nm or 532 nm). Examples of curable materials at such different wavelengths are: 365 nm—SpeedCure TPO, 400 nm—SpeedCure DETX with tertiary amine (both by Lambson Limited of West Yorkshire, UK), and 532 nm—Eosin with tertiary amine. In one embodiment, a support material is made by using a solution with 10% poly acrylic acid in water. To that solution is added 10%-40% of acrylic acid monomers and 0.1%-2% of Speed Cure TPO as the first UV cure system. For ablation material, a 0.1%-5% of Blue 10K525 is added to the solution. For the second cure, another system of a 0.1%-2% Eosin and Speed Cure EDB is added.

Another and more convenient approach to distinguish between two layers is to use the different properties of the active material (that is, the material which makes up the dental device). In this approach, after ablation of the support material, another soft ablation is performed. In this soft ablation stage, only areas that will be used for the active material in the next layer are ablated and softly so, using just enough energy to create a rough surface. In the next stage, where the active material is applied to the surface, the active material enters into the ablated area. In this way, the fully ablated area will be filled as will holes in the rough surface of the soft ablated areas. The support material will be removed by water.

FIG. 1 illustrates aspects of this process 100. At 102, a support material 10 is deposited or otherwise applied on a substrate 12. At 104, the support material is cured, e.g., by exposure to UV radiation at a curing wavelength for the support material. Thereafter, at 106, portions of the support material in an area 14 are removed through laser ablation. The ablation process is controlled so that the underlying substrate 12 is not vaporized or otherwise harmed in this process. This may be achieved through controlled application of the UV radiation which, for example, is applied at a relatively low energy insufficient to vaporize the substrate material. Following ablation of the support material in an area 14 where the desired structure will be fabricated, a soft ablation 108 of the surface of substrate 12 in that area is undertaken. As noted above, the soft ablation serves to roughen the surface of the substrate 12 in the area where the desired structure will be fabricated. This may be done using one or more pulses of the laser at low energy. In one embodiment, a pulsed Nd:YAG laser may be used and the pulsed output of the laser may be controlled so that pulses in the range of 0.1 ns to 1.0 ns are emitted. Longer duration pulses within this range may be used during ablation stages such as 106, while shorter duration pulses within this range may be used during soft ablation stages such as 108.

Following the soft ablation stage 108, a layer of active material 16 is deposited or otherwise applied to the substrate in the same area where the support material was removed, and the soft ablation of the substrate surface has been performed 110. Next, a second layer of support material 18 is deposited over the active material 16 and the remaining layer 10 of support material, and the new layer of support material 18 is UV cured 114.

Following curing of the new layer of support material 18, portions of that new layer of support material are removed through laser ablation 116 in an area 20 in which the next layer of the desired structure will be fabricated. As before, following ablation of the support material in area 20, a soft ablation 118 of the exposed surface of the active material and any portion of the previously deposited support material layer 10 in area 20 is undertaken.

This layer-by-layer building of the desired structure can continue, with further applications of active material 120, applications of support material thereover, curing of the newly added layer of support material, ablation of the newly added layer of support material in a specific area, and soft ablation of the surface of the underlying structure exposed by said ablation, until the form of the desired structure has been obtained. When the form of the desired structure is complete, the support material may be removed 122 by rinsing with water, leaving the desired structure 22 of active material in place on substrate 12.

Figure 2:
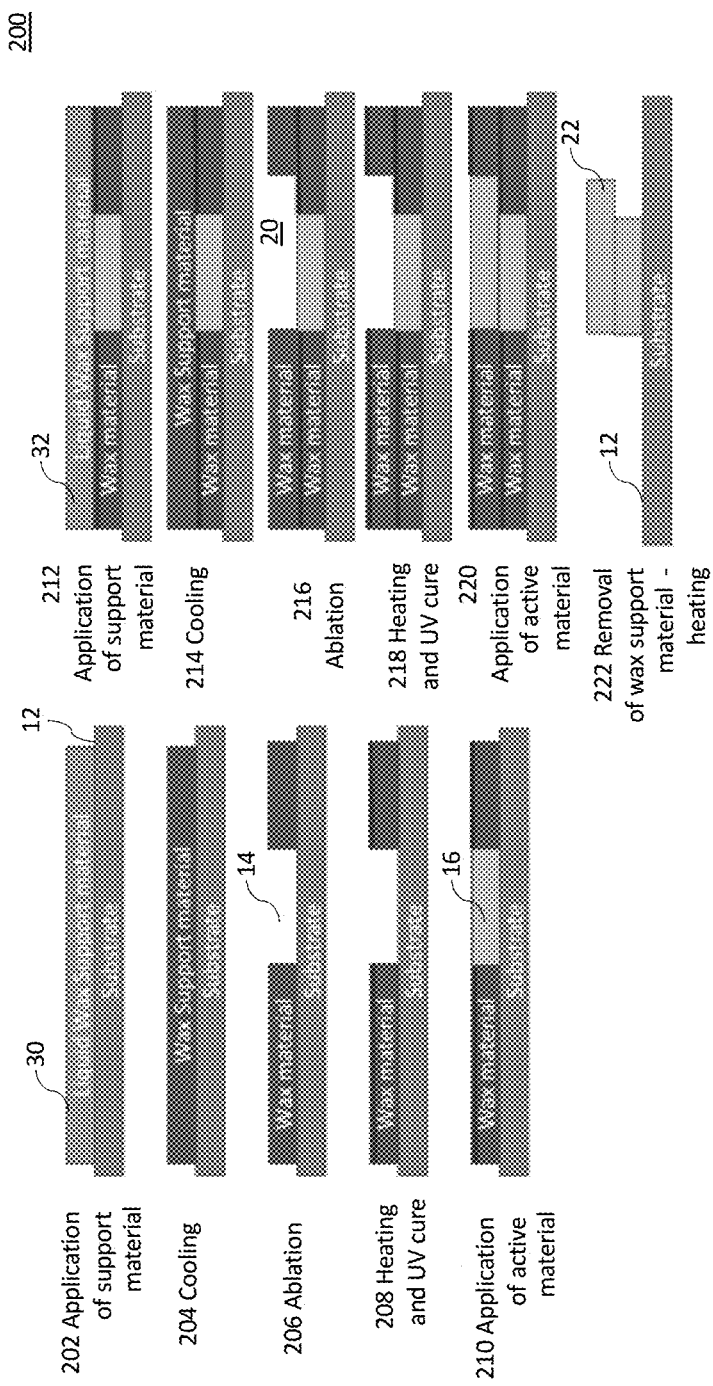
FIG. 2 illustrates an outline of a wax-based process in accordance with further embodiments of the invention.

B. Wax base: Another approach for the support material uses a wax material that can be ablated. For this purpose, a wax material such as polyethylene wax, polypropylene wax, polyethylene glycol wax, bees wax, carnauba wax, iso paraffin wax, etc., can be used as a support material by heating to its melting point. The wax is then applied in its liquid form and solidified immediately after application. The waxes are non-toxic, low ablation threshold materials and, therefore, are well suited for the current application. An example of a wax-based process 200 is illustrated in FIG. 2.

At 202, a support material 30, such as that described immediately above, is deposited or otherwise applied on a substrate 12. At 204, the support material is allowed to cool, and thereafter, at 206, portions of the support material in an area 14 are removed through laser ablation. In order to reduce the ablation threshold of the wax support material, a good absorber at the laser wavelength should be used. For this purpose, all the materials mentioned above are relevant. The ablation process is controlled so that the underlying substrate 12 is not vaporized or otherwise harmed in this process. This may be achieved through controlled application of the laser pulse(s) which, for example, are applied at a relatively low energy insufficient to vaporize the substrate material.

Following ablation of the support material in an area 14 where the desired structure will be fabricated, the structure is heated and cured by exposure to UV radiation 208. To facilitate curing by UV light, 5%-50% of SR 586, SR 587, or SR 324 (from Sartomer of Exton, Pa.) may be added to the wax support material. Optionally, for differentiation between layers, a UV crosslink wax may be added to the support material. The surface is heated before UV curing to enable diffusion of the monomers in upper part of the support material layer.

Following the UV curing, a layer of active material 16 is deposited or otherwise applied to the substrate in the same area where the support material was removed 210. Next, a second layer of support material 32 is deposited over the active material 16 and the remaining layer 30 of support material, and the new layer of support material cooled 214, and ablated 216 in an area 20 in which the next layer of the desired structure will be fabricated. As before, following ablation of the support material in area 20, the structure is heated and cured by exposure to UV radiation 218.

The layer-by-layer building of the desired structure can continue, with further applications of active material 220, applications of support material thereover, cooling of the newly added layer of support material, ablation of the newly added layer of support material in a specific area, etc., until the form of the desired structure has been obtained. When the form of the desired structure is complete, the wax-based support material may be removed 222 by heating, leaving the desired structure 22 of active material in place on substrate 12.

C. Emulsion base: Another way to create a distinction between the inner material of each layer at its surface can be done by an emulation base formulation where a second cure occurs only at the oil phase. Using this approach, the outer layer of the support material will be crosslinked in the second cure without interfering with the first cure. The same materials as in the water base example can be used for the support material with the addition of 5% oil and 0.1%-1% emulsifier.

Figure 3:
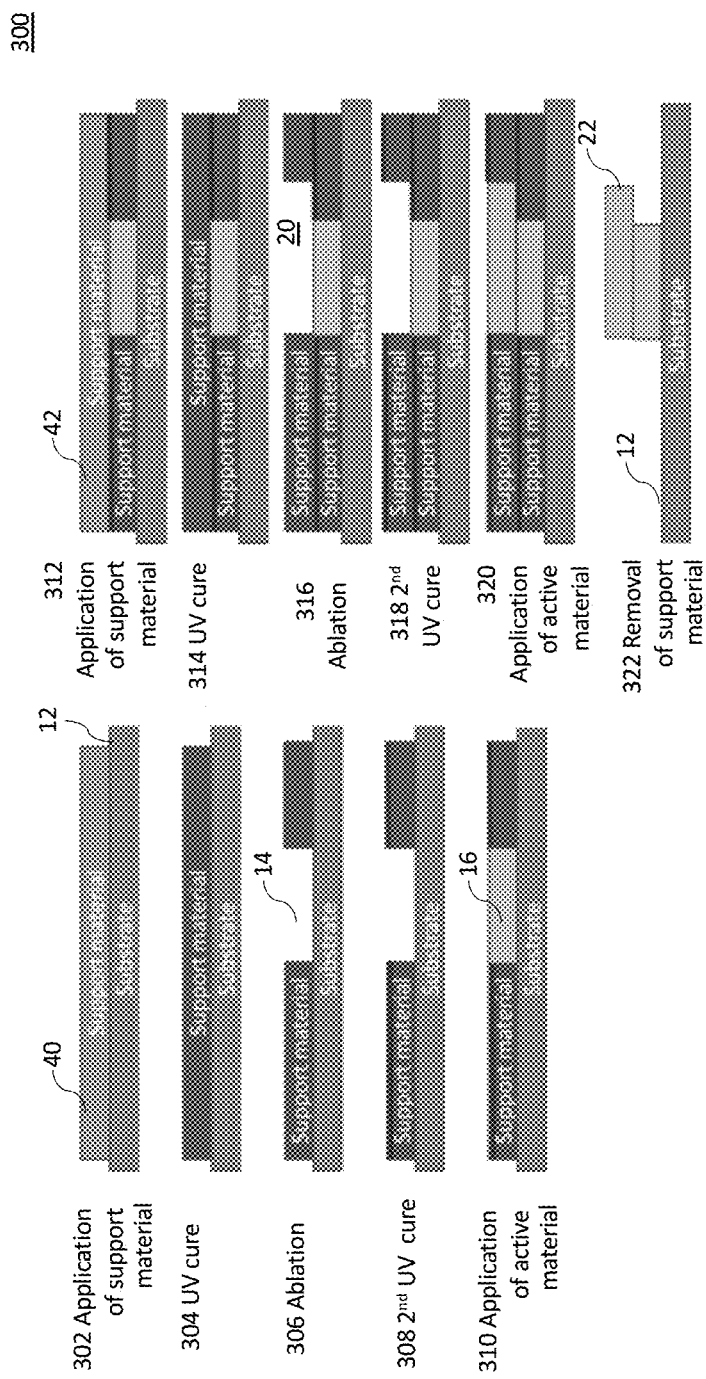
FIG. 3 illustrates an outline of an emulsion-based process in accordance with still additional embodiments of the invention.

FIG. 3 illustrates the main stages of an emulsion-based process 300 in accordance with an embodiment of the present invention. At 302, a support material 40 is deposited or otherwise applied on a substrate 12. At 304, the support material is cured, e.g., by exposure to UV radiation at a curing wavelength for the support material. Thereafter, at 306, portions of the support material in an area 14 are removed through laser ablation. The ablation process is controlled so that the underlying substrate 12 is not vaporized or otherwise harmed in this process. This may be achieved through controlled application of the laser pulse(s) which, for example, are applied at a relatively low energy insufficient to vaporize the substrate material. Following ablation of the support material in an area 14 where the desired structure will be fabricated, a second UV cure 308 is performed. As noted above, this second UV cure occurs only in the oil phase, to distinguish between one layer to another.

Following the second cure, a layer of active material 16 is deposited or otherwise applied to the substrate in the same area where the support material was removed, and the soft ablation of the substrate surface has been performed 310. Next, a second layer of support material 42 is deposited 312 over the active material 16 and the remaining layer 40 of support material, and the new layer of support material 42 is UV cured 314.

Following curing of the new layer of support material, portions of that new layer of support material are removed through laser ablation 316 in an area 20 in which the next layer of the desired structure will be fabricated. As before, following ablation of the support material in area 20, a second UV cure 318 of the exposed surface of the active material and any portion of the previously deposited support material layer in area 20 is undertaken. This layer-by-layer building of the desired structure can continue, with further applications of active material 320, applications of support material thereover, curing and selective ablation of the newly added layer of support material, secondary curing, etc., until the form of the desired structure has been obtained. When the form of the desired structure is complete, the support material may be removed 322, leaving the desired structure 22 of active material in place on substrate 12.

LCST base material: Another approach is to use a low critical solution temperature (LCST) polymer as a support material. These polymers are gelled at higher temperature and are liquid at lower temperature and by using them the support material can be applied in a liquid form and solidified by heating above the polymer gel point. Polymers that can be used for this approach are from the methyl cellulose family or other polymers containing large number of hydrogen bonds. The removal of these polymers can be achieved by cooling below their gel point.

2. The Active Material.

The active material for the dental application in any or all of the above examples can be any material for making dental products such as artificial teeth, dentures, splints, veneers, inlays, onlays, copings, frame patterns, crowns and bridges and the like. The ablation processes used in embodiments of the present invention creates the possibility to use new and better active materials as well as improving processability and reducing application time for the current dental materials (some common active materials are listed below).

One family of new active materials that is very hard to implement with other, conventional fabrication methods is ceramics. Within ceramics, an important example is zirconia, a material that conventional printing technologies do not accommodate well. Each printing device is limited by its application possibilities: inkjet printers work best with very low viscosity materials that do not clog the nozzles, and SLA and DLP processes each work with only a limited number of materials. Both suffer from the fact that other materials should be added to the zirconia, but these additions deteriorate the useful properties of the zirconia. As a result, zirconia structures that are printed with current technologies become brittle and very sensitive to sintering conditions.

A new material that can be implemented only by the ablation processes used in accordance with embodiments of the present invention is a neat zirconia, alumina, ceramic glass or any other ceramic material with a limited amount of additional material to create flowability and processability. The additional material should be easy to remove. For that purpose, two possible routes are presented:

a. Add to the zirconia or any other ceramic material only a solvent that is easy to evaporate. The solvent will give only the processability (even dispersibility could be neglected).

b. Phase separated solid material. Addition of some wax-like material that will create a solid solution with the zirconia or any other ceramic material and by melting will be separated easily.

In one embodiment then, approximately 40%-70% by weight of zirconia or any other ceramic material is added to a solvent, e.g., water, ethanol, glycerol, or other solvent. Limiting the amount of volatile organic compounds (VOC) and reducing flammability are important considerations in choosing the solvent. No additional materials should be added, but surfactants and rheology or leveling modifiers can be added to the formulation.

Partially stabilized zirconia is a mixture of zirconia polymorphs, because insufficient cubic phase-forming oxide (stabilizer) has been added and a cubic plus metastable tetragonal $ZrO_2$ mixture is obtained. A smaller addition of stabilizer to the pure zirconia will bring its structure into a tetragonal phase at a temperature higher than 1000° C. and a mixture of cubic phase and monoclinic (or tetragonal) phase at a lower temperature. This partially stabilized zirconia is also called tetragonal zirconia polycrystal (TZP). Several different oxides, e.g., magnesium oxide (MgO), yttrium oxide, ($Y_2O_3$), calcium oxide (CaO), and cerium oxide ($Ce_2O_3$), can be added to zirconia to stabilize the tetragonal and/or cubic phases. Additional information regarding these ceramic materials may be found in for example, U.S. Pat. No. 9,592,105 and U.S. PGPUB No. 2002/0006532.

The ceramic material of prostheses fashioned in accordance with embodiments of the invention can be chosen to provide the desired flexural strength and light transmissivity.

One preferred ceramic for that purpose is aluminum oxide. Aluminum oxide is strong, hard, transparent, and has a neutral color, and is readily available. In addition, aluminum oxide is also suitable since its optical transmittance is substantially constant throughout the visible spectrum and it therefore transmits all wavelengths of visible light. If desired, up to one percent magnesium oxide may be added to the aluminum oxide for aiding in sintering and enhancing the strength of the aluminum oxide.

Other materials may be employed that also provide a light transmissive crystalline ceramic prosthesis. Magnesium-aluminum spinel, zirconium oxide, yttrium aluminum garnet, zirconium silicate, yttrium oxide and mullite, for example, are crystalline materials suitable for prostheses fashioned in accordance with embodiments of the invention. Additional information regarding these ceramic materials may be found in for example, U.S. Pat. Nos. 5,231,062; 5,096,862; 4,098,612; and 4,174,973.

The active material used for the dental product can also be one or more of the following and it can be used in a one material dental product or a more than one material dental product (for instance, a dental product from ceramic and a bleaching product for the outer layer):

A. Amalgam. Also, commonly named "filling," amalgam is a sealant made of small particles of silver, tin, and copper alloyed with mercury. Its mechanical properties and longevity have made it a first choice for many years. Its main flaw, however, is that it contains mercury (in a stable form) and its lack of aesthetics.

B. Composite. These aesthetic fillings have been available for a long time. Today this material is the first choice in conservative restorative dentistry, thanks to the important progress made for pulp protection and in the adhesive techniques. The composite is inserted into the cavity and hardened with a polymerization lamp. Composite is also used to permanently seal crowns and bridges C. Glass ionomer. This material is used for temporary fillings of deciduous teeth.

It is also used for permanent sealing of crowns and bridges.

D. Gold: In dentistry, gold is found in the form of gold alloys. It is an ideal material because of its harmlessness, precision, and rigidity, which is essential for important prosthetic realizations. It is mainly used for posterior reconstructions. Grey gold is usually chosen because it is less visible.

E. Ceramics. Because of the vast aesthetic possibilities they offer, ceramic restorations have become the material of choice in fixed prosthetics (crowns and bridges).

F. Steel (chrome-cobalt). Used in removable prosthetics for framework and clasps.

G. Titanium. Used in implantology due to its antiallergic qualities. It can also be used in rare cases of metal allergies with removable prosthetics.

H. Acrylic resins and other polymers. The teeth of dentures are made of acrylic resin or ceramics. Today, other resin products are also available.

I. Zirconium. Zirconium is mainly used for the framework of fixed prosthetics. It is a type of CADCAM ceramic used in dentistry for the last 20 years; popular due to its biologic compatibility and its aesthetic properties.

J. Tooth bleaching products. Used to optimize the aesthetics of yellowed front teeth. For night use, they consist of "carbamide peroxide" gels. For day use, derivatives of hydrogen peroxide are used. For internal bleaching, for example a tooth having darkened after a root treatment, carbamide peroxide is also used. The gels used for microabrasion are composed of phosphoric acid.

Ablation: The ablation operations discussed herein may be performed as described by Zenou et al., US PGPUB 2017/0189995 A1, incorporated herein by reference.

Thus, ablation-based methods for dental applications that make use of novel support materials have been described. In embodiments of the invention, a three-dimensional dental device may be fabricated by applying a layer of support material in a liquid form on a substrate surface; hardening the support material by cooling or ultraviolet (UV) curing to create a solid layer of support material; ablating, using a laser beam, undesirable portions of the solid layer of support material to create an area within the solid layer of support material in which a desired structure will be formed; depositing active dental material into the area within the solid layer of support material in which a desired structure will be formed; repeating the applying, hardening, ablating, and depositing steps, layer by layer, until the three-dimensional dental device has been completed; and subsequently removing remaining support material by water or other solvent. Following removal of the remaining support material, the three-dimensional dental device is sintered in an oven.

In various embodiments, the active dental material may be deposited in a liquid form by ink jet printing, LIFT, DLP printing, SLA printing, or by mechanical application. The active dental material may be any one or more of: amalgam, a composite, glass ionomer, gold, ceramic, steel, titanium, acrylic resins, polymer, zirconium, and tooth bleaching products.

Although not discussed in detail above in connection with the examples of FIGS. 1-3, following deposition of a layer of the active dental material it may be necessary to remove solvent from the deposited dental material. This may be done by heating, for example by air flow or exposure to a heating lamp. Alternatively, or in addition, the active dental material may need to be hardened layer-by-layer, for example by UV curing.

The layer of support material may be applied on the substrate surface by ink jet printing, LIFT, DLP printing, SLA printing, or by mechanical application. In some embodiments, a second curing of the support material may be performed to create a hardened outer surface of the support material. This second curing of the support material may be performed using UV radiation of the same or a different wavelength than was used for the UV curing to create the solid layer of support material. In various embodiments the support material may be a water-based support material, a wax-based support material, or an emulsifier-based support material Water-based support materials useful in embodiments of the present invention include: water miscible solvents, water-soluble polymers, and monomers that form a water-soluble polymer. Water-based support materials also may include one or more of: polyvinyl pyrrolidone, polyethylene glycol, poly acrylic acid, poly propyl acrylamide, vinyl pyrrolidone, acrylic acid, ethylene glycol acrylate family, iso propyl acrylamide; and a laser wavelength absorber (e.g., carbon fillers, metals, inorganic pigments, and organic pigments) of e.g., 0.1%-5% by volume in some embodiments, or, in other embodiments, of greater percentage by volume, for example, up to approximately 20% by volume or even up to approximately 50% by volume.

Wax-based support material useful in embodiments of the present invention include: polyethylene wax, polypropylene wax, polyethylene glycol wax, bees wax, carnauba wax, and iso paraffin wax, and a laser wavelength absorber (e.g., carbon fillers, metals, inorganic pigments, and organic pigments).

Emulsifier-based support material useful in embodiments of the present invention include any of the water miscible solvents, water-soluble polymers and monomers that form a water-soluble polymer, with the addition of 5% oil and 0.1%-1% emulsifier by volume.

What is claimed is:

1. A method of fabricating a three-dimensional dental device, comprising:
   applying a layer of support material in a liquid form on a substrate surface by one of: ink jet printing, laser-induced forward transfer (LIFT), digital light projector (DLP) printing, stereolithographic (SLA) printing, or mechanically;
   hardening the support material by (i) ultraviolet (UV) curing at a first wavelength to create a solid layer of support material, and (ii) UV curing the solid layer of the support material at a second wavelength to create a hardened outer surface of the support material, wherein the second wavelength differs from the first wavelength;
   ablating, using a laser beam, undesirable portions of the solid layer of support material to create an area within the solid layer of support material in which a desired structure will be formed;
   depositing active dental material into the area within the solid layer of support material in which a desired structure will be formed;
   repeating the applying, hardening, ablating, and depositing steps, layer by layer, until the three-dimensional dental device has been completed; and
   removing remaining support material by water or other solvent.

2. The method of claim 1, wherein the active dental material is deposited in a liquid form by one of ink jet printing, laser-induced forward transfer (LIFT), digital light projector (DLP) printing, stereolithographic (SLA) printing, or mechanically.

3. The method of claim 1, further comprising following deposition of the active dental material, heating the deposited dental material so as to remove solvent from the deposited dental material.

4. The method of claim 3, wherein the dental material is heated by one of air flow or exposure to a heating lamp.

5. The method of claim 1, further comprising following deposition of the active dental material, hardening the dental material.

6. The method of claim 5, wherein the dental material is hardened by UV curing.

7. The method of claim 1, further comprising following removal of the remaining support material, sintering the three-dimensional dental device in an oven.

8. The method of claim 1, wherein the support material is a water-based support material comprising one or more of: water miscible solvents, water-soluble polymers, and monomers that form a water-soluble polymer.

9. The method of claim 8, wherein the water-based support material comprises one or more of: polyvinyl pyrrolidone, polyethylene glycol, poly acrylic acid, poly propyl acrylamide, vinyl pyrrolidone, acrylic acid, ethylene glycol acrylate family, iso propyl acrylamide; and a laser wavelength absorber.

10. The method of claim 9, wherein the laser wavelength absorber comprises one of carbon fillers, metals, inorganic pigments, and organic pigments.

11. The method of claim 10, wherein the laser wavelength absorber comprises 0.1%-5% by volume of the support material.

12. The method of claim 10, wherein the laser wavelength absorber comprises up to 20% by volume of the support material.

13. The method of claim 10, wherein the laser wavelength absorber comprises up to 50% by volume of the support material.

14. The method of claim 8, wherein the active dental material comprises or more of: amalgam, a composite, glass ionomer, gold, ceramic, steel, titanium, acrylic resins, polymer, zirconium, and tooth bleaching products.

15. The method of claim 1, wherein the support material comprises a wax-based support material.

16. The method of claim 15, wherein the wax-based support material comprises one of polyethylene wax, polypropylene wax, polyethylene glycol wax, bees wax, carnauba wax, iso paraffin wax, and a laser wavelength absorber.

17. The method of claim 16, wherein the laser wavelength absorber comprises one of carbon fillers, metals, inorganic pigments, and organic pigments.

18. The method of claim 17, wherein the active dental material comprises one or more of: amalgam, a composite, glass ionomer, gold, ceramic, steel, titanium, acrylic resins, polymer, zirconium, and tooth bleaching products.

19. The method of claim 1, wherein the support material is an emulsifier-based support material comprising one or more of: water miscible solvents, water-soluble polymers, and monomers that form a water-soluble polymer with the addition of 5% oil and 0.1%-1% emulsifier by volume.

20. The method of claim 19, wherein the active dental material comprises one or more of: amalgam, a composite, glass ionomer, gold, ceramic, steel, titanium, acrylic resins, polymer, zirconium, and tooth bleaching products.

* * * * *